UNITED STATES PATENT OFFICE.

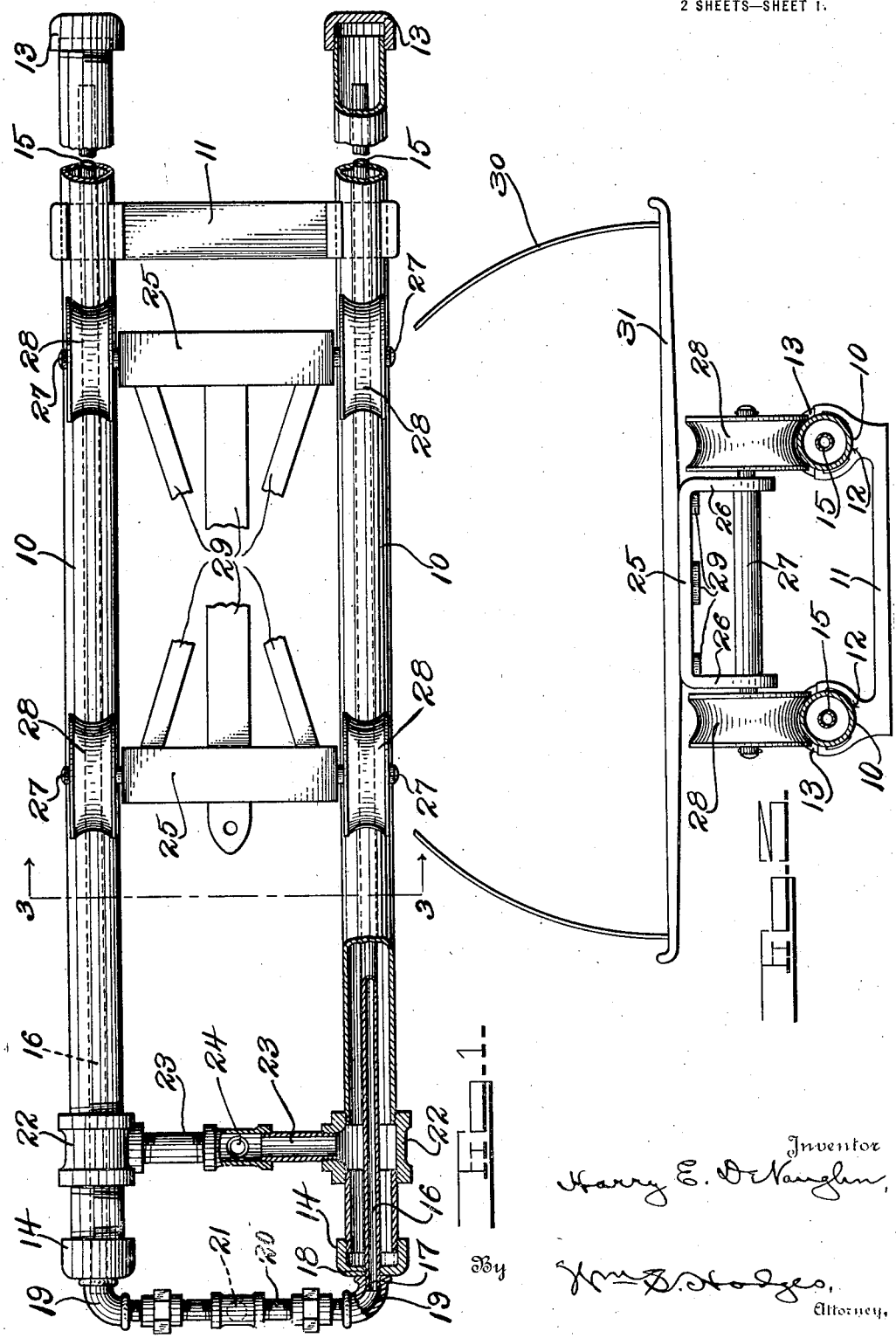

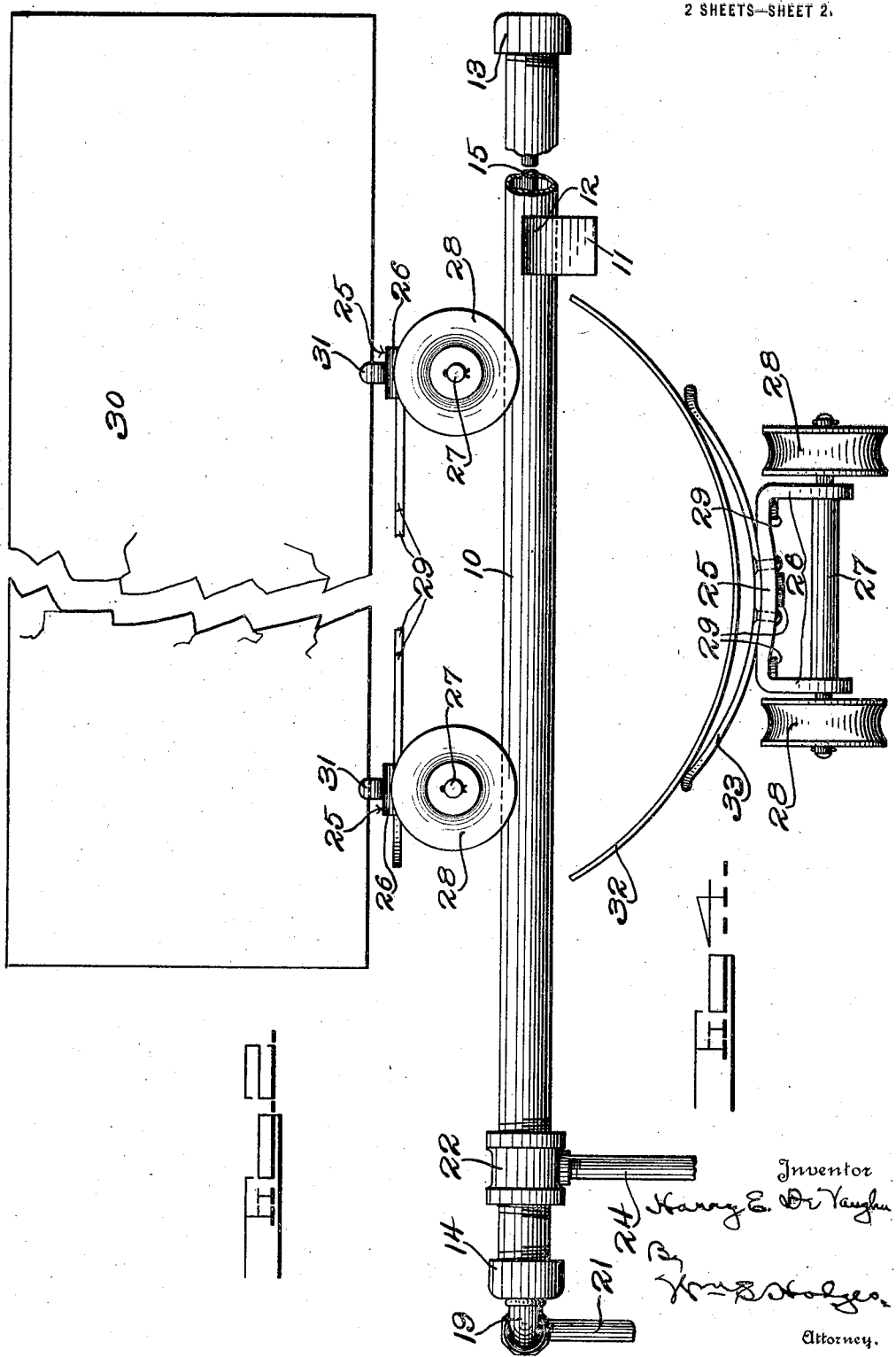

HARRY E. DE VAUGHN, OF MORGANTOWN, WEST VIRGINIA, ASSIGNOR TO UNITED STATES WINDOW GLASS COMPANY, OF MORGANTOWN, WEST VIRGINIA, A CORPORATION OF WEST VIRGINIA.

WINDOW-GLASS-FLATTENING OVEN.

1,352,881.            Specification of Letters Patent.    Patented Sept. 14, 1920.

Application filed June 2, 1916. Serial No. 101,399.

*To all whom it may concern:*

Be it known that I, HARRY E. DE VAUGHN, a citizen of the United States, residing at Morgantown, in the county of Monongalia and State of West Virginia, have invented new and useful Improvements in Window-Glass-Flattening Ovens, of which the following is a specification.

This invention is an improved shove-pan and track for delivering window glass to the flattener in a window glass flattening oven.

Heretofore, one of the greatest troubles in window glass factories, has been to secure a pan track for the flattening oven which could be kept in a good working condition, without frequent and expensive renewals of the same, it being a regular occurrence to suffer a loss of five to ten per cent. of the glass handled with the shove pans and tracks now in general use. One of the objects of the invention is to overcome the foregoing objection, by providing a lighter track, having a track rail which will remain straight, notwithstanding the high temperatures to which it is subjected. A further object is to provide a track rail which will not scale, but which will wear smooth allowing the pan to travel thereover without jarring or vibrating enough to cause the glass to break. A further object is to provide a roller pan carriage mounted on wheels grooved to fit the track and rails, and capable of traveling over the rails with a smoothness that will guarantee the least possible shock to the glass while delivering the same to the flattener.

The invention will be hereinafter fully set forth and particularly pointed out in the claims.

In the accompanying drawings:—

Figure 1 is a plan view of a track constructed in accordance with the invention, including the shove pan. Fig. 2 is a side elevation thereof. Fig. 3 is a cross section on line 3—3 Fig. 1. Fig. 4 is a similar view illustrating a slight modification.

Referring to the drawings, the shove pan track is constructed of tubular rails 10, held in spaced relation by ties 11, provided with seats 12, to receive said rails. The ends of the tubular rails are closed by caps 13, 14, respectively, threaded to engage correspondingly threaded portions on the ends of the rail. Extending longitudinally into the tracks 10, are tubes 15, each having a discharge end adjacent the cap 13 of its rail, and a supply end 16, provided with a threaded portion engaging a threaded opening in the cap 14, of its rail, as indicated at 18. The projecting end 17 forms a threaded nipple to which is connected an elbow 19, the elbows 19 of the respective rails being connected by a supply pipe 20, forming a brace for the contiguous ends of the rails 10, and receiving water or other cooling fluid through a supply main 21, connected with any suitable source of supply. Each of the rails 10 is formed of a long length of tubing and a short length of tubing, united by couplings or T's 22, which are connected by branch pipes 23, with a discharge pipe 24, which discharge pipe also serves to brace the rails.

The pan supporting frame comprises transverse members 25 provided with depending arms 26, in which are rotatably mounted the axles 27, provided with the carrying wheels 28, which are concaved to fit the convexity of the rail. The transverse members 25 are connected by suitable frame bars 29. The wheels 28 may, if desired, be provided with antifriction bearings of any desired construction, and inasmuch as this is obvious construction, the same is not illustrated. In Fig. 3 is illustrated the style of pan used for handling a glass cylinder when "shawled", the shawl being indicated at 30, resting upon a suitable support 31, mounted upon the carriage. In Fig. 4 the glass is shown in cylinder, or roller form, as indicated at 32, the supports 33, attached to the carriage being correspondingly shaped.

In operation, water or other cooling fluid is supplied from the main 21, through the branch pipe 20 and elbows 19, to the tubes 15, flowing through the latter to the discharge end thereof, and then flowing back around said tubes, and inside of the rails, to the T's 22, at which points the fluid enters the branches 23, and flows out through pipe 24. It will thus be seen that by means of this arrangement the rails will not warp, or be otherwise changed under the intense heat to which they are subjected, and the formation of scale and the like on the rails, is prevented. The pan carriage is provided with wheels which are grooved to fit the rails, and by reason of the shape of the wheels and the rails, the carriage will travel with minimum shock, while delivering the glass to the flattener.

Having thus explained the nature of my invention, and described an operative manner of constructing and using the same, although without attempting to set forth all of the forms in which it may be made, or all of the forms of its use, what I claim is:—

1. An improvement in glass flattening ovens comprising a shove pan track formed of tubular rails closed at their ends, water-distributing tubes extended longitudinally into said rails through one closed end thereof, each water tube having a discharge end located contiguous to the other closed end of its rail, a transversely disposed rigid fluid supply pipe connecting the supply ends of said tubes, and a transversely disposed rigid discharge pipe lying contiguous to the supply pipe and connecting said rails, said supply and discharge pipes coöperating to brace said rails.

2. An improvement in glass flattening ovens comprising a shove pan track formed of tubular rails closed at their ends, longitudinally disposed water distributing tubes within said rails, each tube having a discharge end within its rail terminating near one closed end of the rail, and a supply end projected through the other closed end of its rail, a supply pipe provided with laterally disposed rigid branches connected at their ends with the projected ends of the respective tubes, and a discharge main having laterally disposed rigid branches lying contiguous to the branches of the supply pipe and connected with the respective rails, said branches of said supply and discharge pipes coöperating to brace the contiguous portions of the rails.

3. As an improvement in flattening ovens, a shove pan track comprising tubular rails closed at their ends, each rail being formed in sections, T couplings uniting the respective sections of said rails, a discharge pipe having branches rigidly connected with said couplings, and bracing said rails, water distributing tubes disposed longitudinally within said rails and having their discharge ends within the rails, and a fluid supply main connected with said tubes.

In testimony whereof I have hereunto set my hand in presence of two subscribing witnesses.

HARRY E. DE VAUGHN.

Witnesses:
WM. M. SHEAVLY,
H. W. HUNT.